(12) United States Patent
Hile

(10) Patent No.: US 7,020,930 B2
(45) Date of Patent: *Apr. 4, 2006

(54) COMBINATION LAWN CARE SWEEPER THATCHER SHREDDER

(76) Inventor: Jeffrey B. Hile, 719 Wexford-Bayne Rd., Wexford, PA (US) 15090

( * ) Notice: Subject to any disclaimer, the term of this patent is extended or adjusted under 35 U.S.C. 154(b) by 415 days.

This patent is subject to a terminal disclaimer.

(21) Appl. No.: 10/420,096

(22) Filed: Apr. 22, 2003

(65) Prior Publication Data

US 2003/0204932 A1 Nov. 6, 2003

Related U.S. Application Data

(63) Continuation-in-part of application No. 09/971,382, filed on Oct. 5, 2001, now Pat. No. 6,574,828.

(51) Int. Cl.
*E01H 1/08* (2006.01)

(52) U.S. Cl. .................................. 15/340.4; 15/332

(58) Field of Classification Search .............. 15/52.1, 15/79.2, 82, 83, 328, 331, 334, 354, 332, 15/384; 56/12.6, 12.9
See application file for complete search history.

(56) References Cited

U.S. PATENT DOCUMENTS

| | | | | |
|---|---|---|---|---|
| 1,356,272 A | * | 10/1920 | Dunn | 15/342 |
| 2,538,643 A | * | 1/1951 | Gregory | 56/13.1 |
| 2,590,734 A | * | 3/1952 | Strong | 56/501 |
| 2,661,584 A | | 12/1953 | Ronning | |
| 2,824,335 A | * | 2/1958 | Moffat | 15/345 |
| 3,087,180 A | * | 4/1963 | Webster | 15/79.2 |
| 3,184,777 A | * | 5/1965 | Norden | 15/340.3 |
| 3,189,932 A | * | 6/1965 | Daneman | 15/340.3 |
| 3,406,424 A | | 10/1968 | Rush | |
| 3,409,933 A | * | 11/1968 | Larsson | 15/364 |
| 3,491,399 A | * | 1/1970 | Burgoon et al. | 15/351 |
| 3,790,986 A | * | 2/1974 | Burger | 15/328 |
| 3,808,632 A | * | 5/1974 | Aagesen | 15/83 |
| 3,822,436 A | * | 7/1974 | Burgoon | 15/354 |
| 3,859,777 A | * | 1/1975 | Doering | 56/16.7 |
| 3,959,846 A | * | 6/1976 | Yasuda | 15/331 |
| 3,995,415 A | * | 12/1976 | Hoffmann | 56/364 |
| 4,366,593 A | * | 1/1983 | Parikh | 15/52.1 |
| 4,567,623 A | * | 2/1986 | Walton | 15/337 |
| 4,654,927 A | | 4/1987 | Novinger | |
| 5,005,597 A | * | 4/1991 | Popelier et al. | 134/25.1 |
| 5,010,620 A | * | 4/1991 | Young | 15/347 |
| 5,134,838 A | * | 8/1992 | Swisher et al. | 56/16.6 |

(Continued)

FOREIGN PATENT DOCUMENTS

JP 411229336 A 8/1999

*Primary Examiner*—Terrence R. Till
(74) *Attorney, Agent, or Firm*—Carothers & Carothers

(57) ABSTRACT

A lawn sweeper is provided having rotary brushes mounted in a housing and projecting through a bottom opening in the housing for sweeping up debris. A vacuum fan with an internal shredder is also mounted to the housing and communicates through a vacuum chute with the bottom opening for drawing in, shredding and discharging debris swept up by the brushes. A damper valve plate is disposed in the vacuum chute between the brushes and the vacuum fan and is operable for closing off the vacuum chute to provide a leaf vacuum port. A linkage is connected to a damper valve plate and also to the drive for the brushes to simultaneously disengage the drive for the brushes and to close off the vacuum chute with the damper valve plate.

20 Claims, 17 Drawing Sheets

U.S. PATENT DOCUMENTS

| | | | | |
|---|---|---|---|---|
| 5,249,332 A | * | 10/1993 | Wilkerson | 15/384 |
| 5,287,684 A | * | 2/1994 | Beroth | 56/13.2 |
| 5,404,613 A | * | 4/1995 | Whyte | 15/320 |
| 5,435,118 A | * | 7/1995 | Cobile | 56/13.4 |
| 5,718,017 A | * | 2/1998 | Pavlick | 15/340.1 |
| 6,003,195 A | * | 12/1999 | Whitney | 15/314 |
| 6,519,805 B1 | * | 2/2003 | Firdaus et al. | 15/334 |
| 6,574,828 B1 | * | 6/2003 | Hile | 15/340.4 |

* cited by examiner

COMBINATION LAWN CARE SWEEPER THATCHER SHREDDER

CROSS REFERENCE

This application is a continuation-in-part of application Ser. No. 09/971,382, filed Oct. 5, 2001, now U.S. Pat. No. 6,574,828, for COMBINATION LAWN CARE SWEEPER THATCHER SHREDDER.

BACKGROUND OF THE INVENTION

This invention relates generally to yard or lawn machines. More particularly, this invention relates to a combination lawn care mobile machine which can sweep, vacuum, thatch and shred.

Typical lawn brooms include a rotary drum having a plurality of rows of bristles secured thereto which sweep the surface to be cleaned upon rotation. In addition to lawn sweepers for sweeping up leaves and other debris, many other yard machines have been developed over the years, such as, mowers, vacuums, blowers, shredders, chippers and trimmers.

It is a principal object of the present invention to provide a lawn sweeper which is more efficient than those of the prior art and which also has incorporated into the machine additional features for vacuuming, shredding, chipping, and thatching.

SUMMARY OF THE INVENTION

The mobile sweeper apparatus of the present invention is comprised of a wheel supported housing to be moved over an underlying surface to be swept of debris, and which housing is also provided with a bottom opening. A rotary brush mechanism is mounted in the housing and projects through the bottom opening of the housing for sweeping up debris from an underlying surface and a drive mechanism is connected for rotatably driving the brush mechanism. In addition, a vacuum fan with shredder impellers is mounted in the housing and communicates through a vacuum chute with the bottom opening of the housing for drawing in, shredding or chipping and discharging debris swept up by the brush mechanism.

A damper valve dam or plate is disposed in this vacuum chute between the brush mechanism and the shredder fan and is operable for closing off the vacuum chute. Also, a normally close vacuum port is positioned on the vacuum chute between the damper valve plate and the shredder fan for connecting a vacuum conduit to this port for vacuum communication with the fan for thereby converting the mobile apparatus to a vacuum device. This vacuum conduit may be in the form of a vacuum hose for vacuuming up leaves or other debris, or the vacuum conduit may be in the form of a funnel chute for inserting debris to be shred or chipped by the shredder fan.

The brush mechanism is preferably provided in the form of a pair of substantially parallel elongated rotary brushes mounted in the housing for rotation about their axis which extend in the direction of their elongation, and which is transverse to the direction of normal forward movement of the housing. These brushes project through the bottom opening of the housing for sweeping the underlying surface and the brushes are driven in counter rotation whereby the debris being swept is swept upwardly between the brushes to provide a more efficient sweeping action. The rotary brushes may have radially extending bristles which may intermesh with bristles of the adjacent parallel rotary brush for even more efficient sweeping action. In yet another form the intermeshing bristles of the elongated brushes may be comprised of elongate bristle paddle type sweeper blades.

The mobile sweeper apparatus of the present invention may be self propelled or may include attachment mechanism for attaching the housing of the apparatus to a motorized vehicle, such as a lawn tractor, for moving the housing. This drive mechanism further includes a powered takeoff to drive the brush mechanism and shredder fan. The power takeoff may be from a lawn tractor in the form of a belt drive with a spring loaded belt tension pulley for easy connection of the apparatus to the take-off drive of the motorized vehicle.

The rotary brushes of the mobile sweeper apparatus of the present invention can be readily exchanged in whole or in part with radially extending wire tines for thatching a lawn. In addition, the height of the housing for the apparatus may be adjusted above the underlying surface to be swept or thatched to the appropriate height as required for the conditions.

An important feature of the mobile sweeper apparatus of the present invention is the inclusion of linkage which when manipulated closes the damper plate disposed in the vacuum chute between the brush mechanism and the shredder fan in order for closing off the vacuum chute when making use of the vacuum port. This same mechanism also simultaneously serves to disengage the drive for the brush mechanism. Accordingly, the brushes do not continue to rotate in one position thereby damaging the underlying turf. The disengaged brush mechanism also provides safety in that the operator, or another person nearby, cannot become entangled with the brush mechanism.

Another important feature of the present invention is the inclusion of a clean-out access adjacent the intake of the shredder fan in order to permit clean-out of impacted leaves and other debris within the vacuum chute when the apparatus is in an off position.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF PREFERRED EMBODIMENTS

Figure 1:
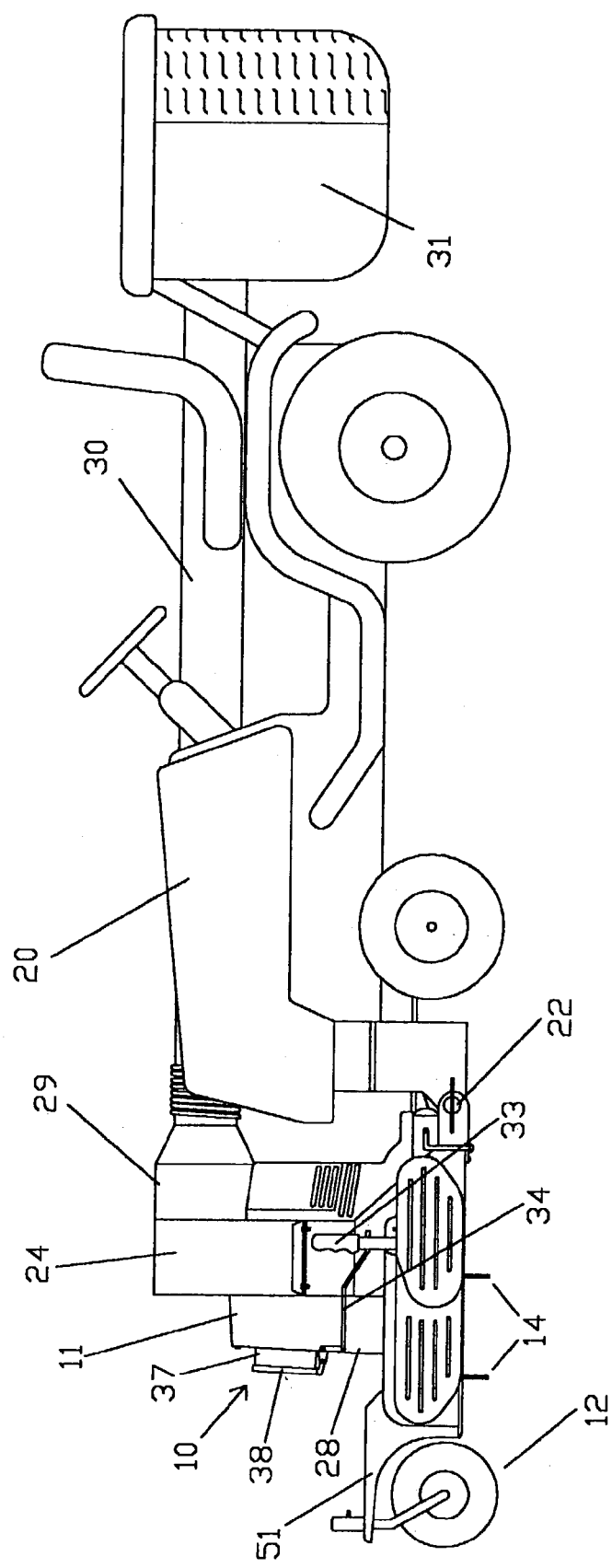
FIG. 1 is a view in left side elevation of the mobile sweeper apparatus of the present invention attached to the forward end of a lawn tractor.
Figure 2:
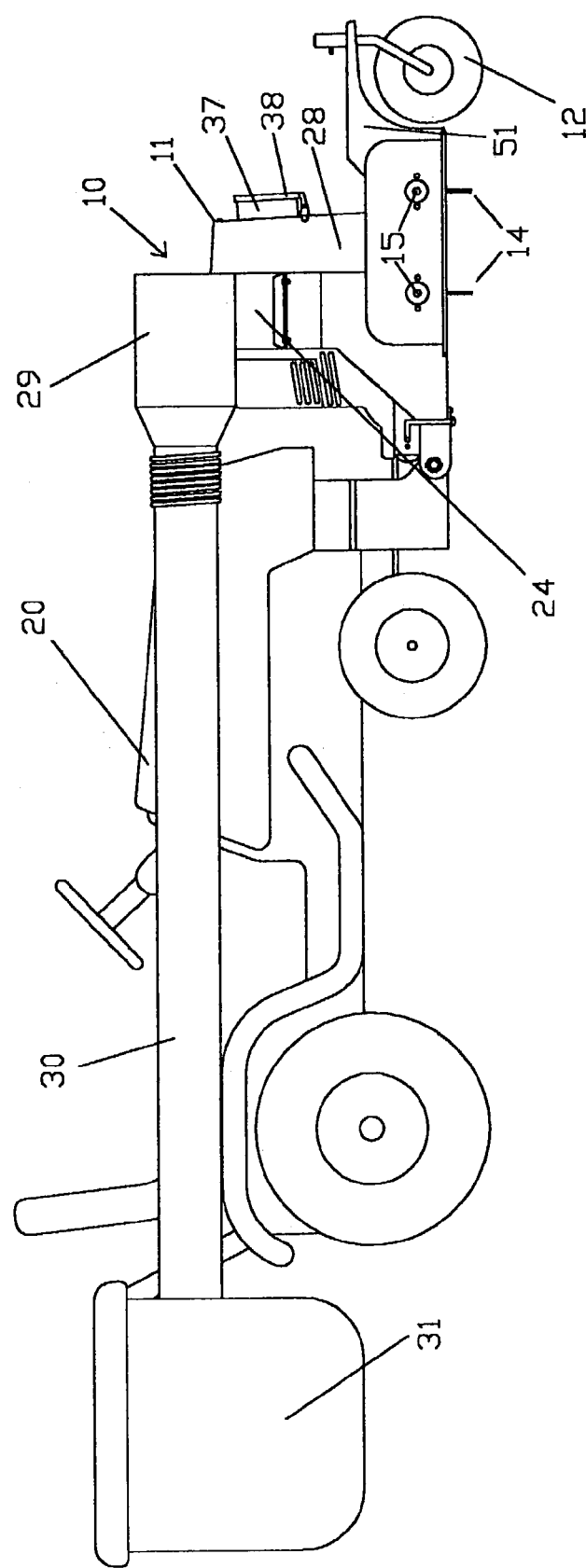
FIG. 2 is a view in right side elevation of the apparatus shown in FIG. 1.
Figure 3:
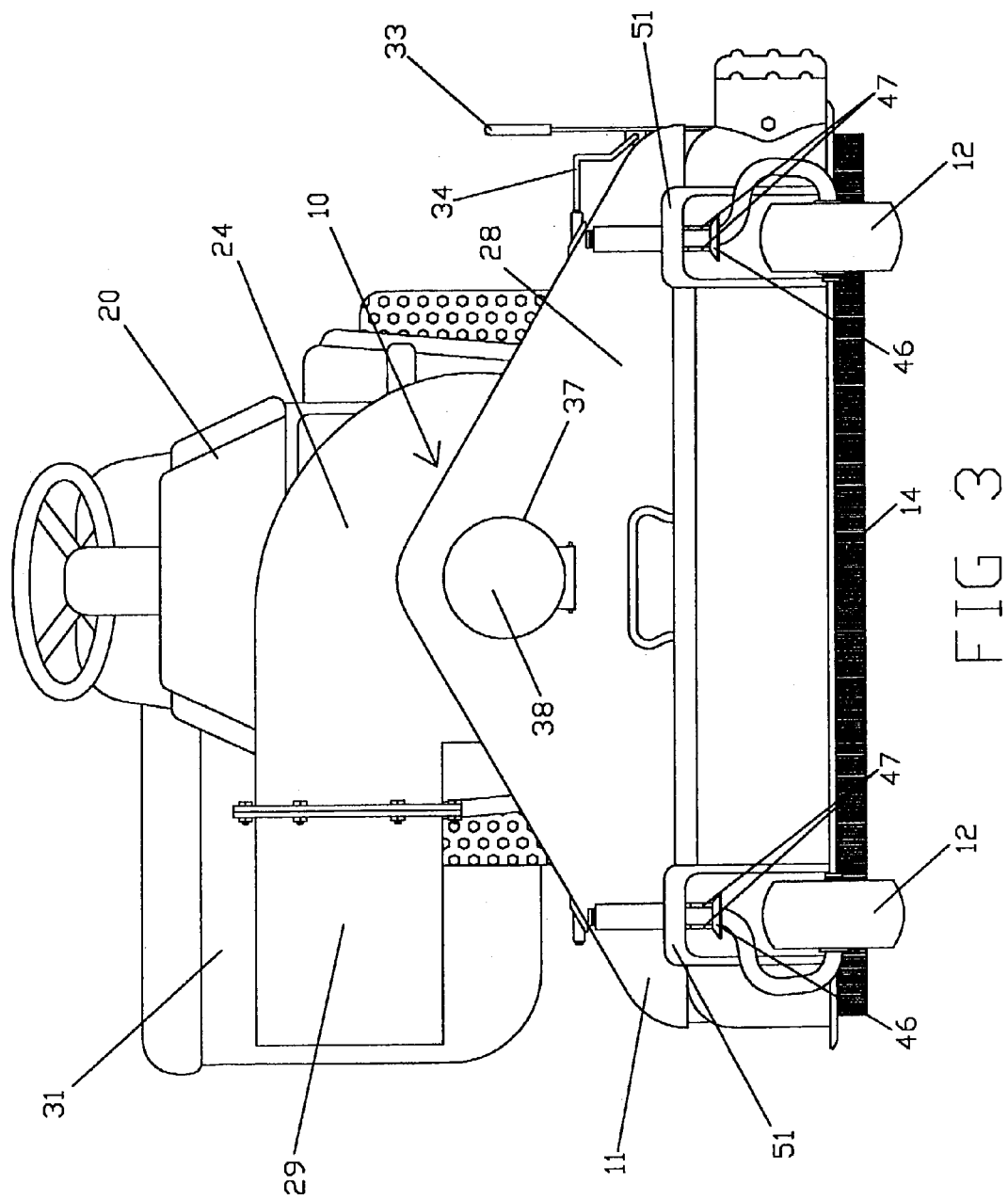
FIG. 3 is an enlarged view in front elevation of the apparatus shown in FIGS. 1 and 2.
Figure 4:
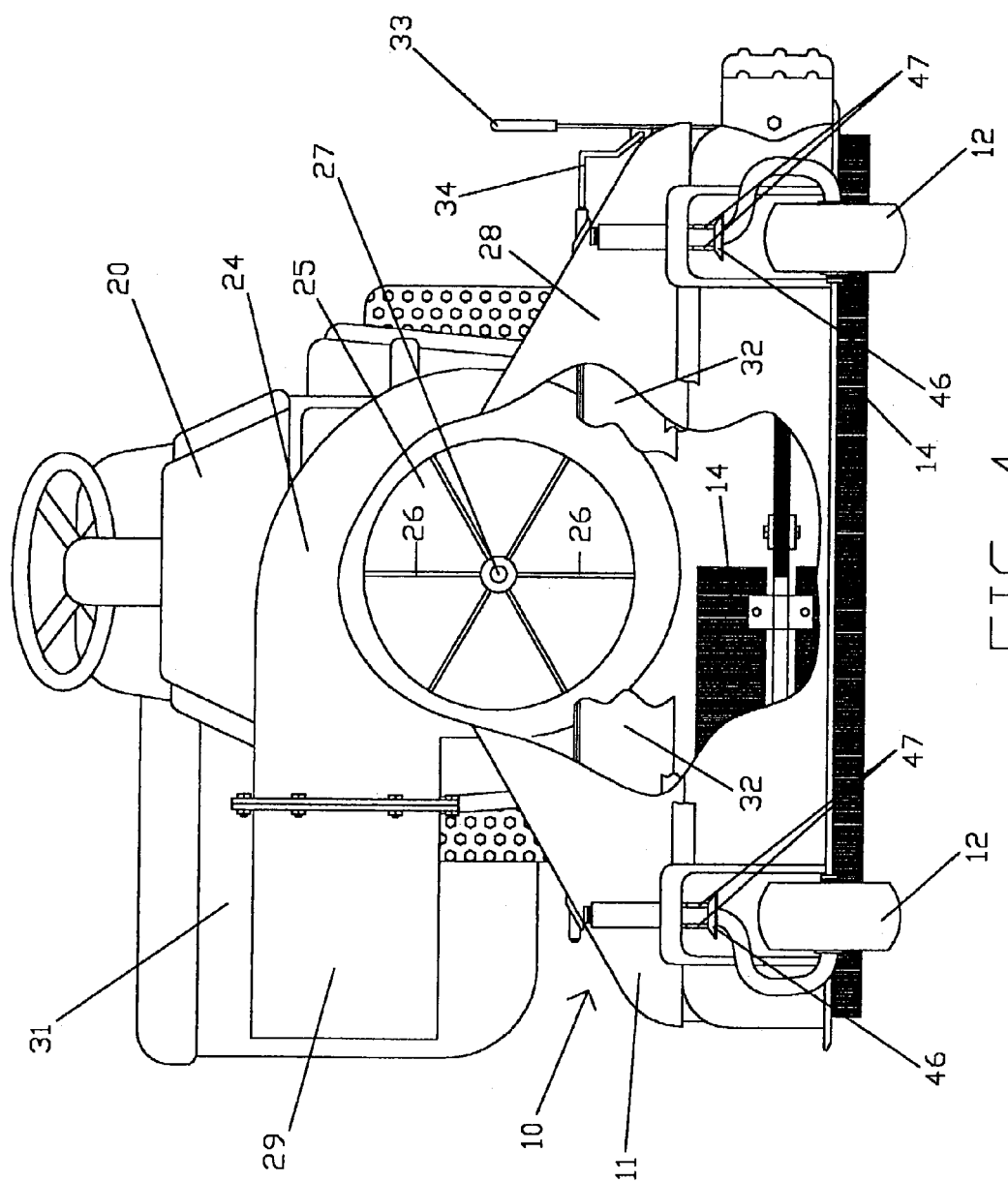
FIG. 4 is a view in front elevation of the apparatus as shown in FIG. 3 with portions removed to disclose internal components.
Figure 5:
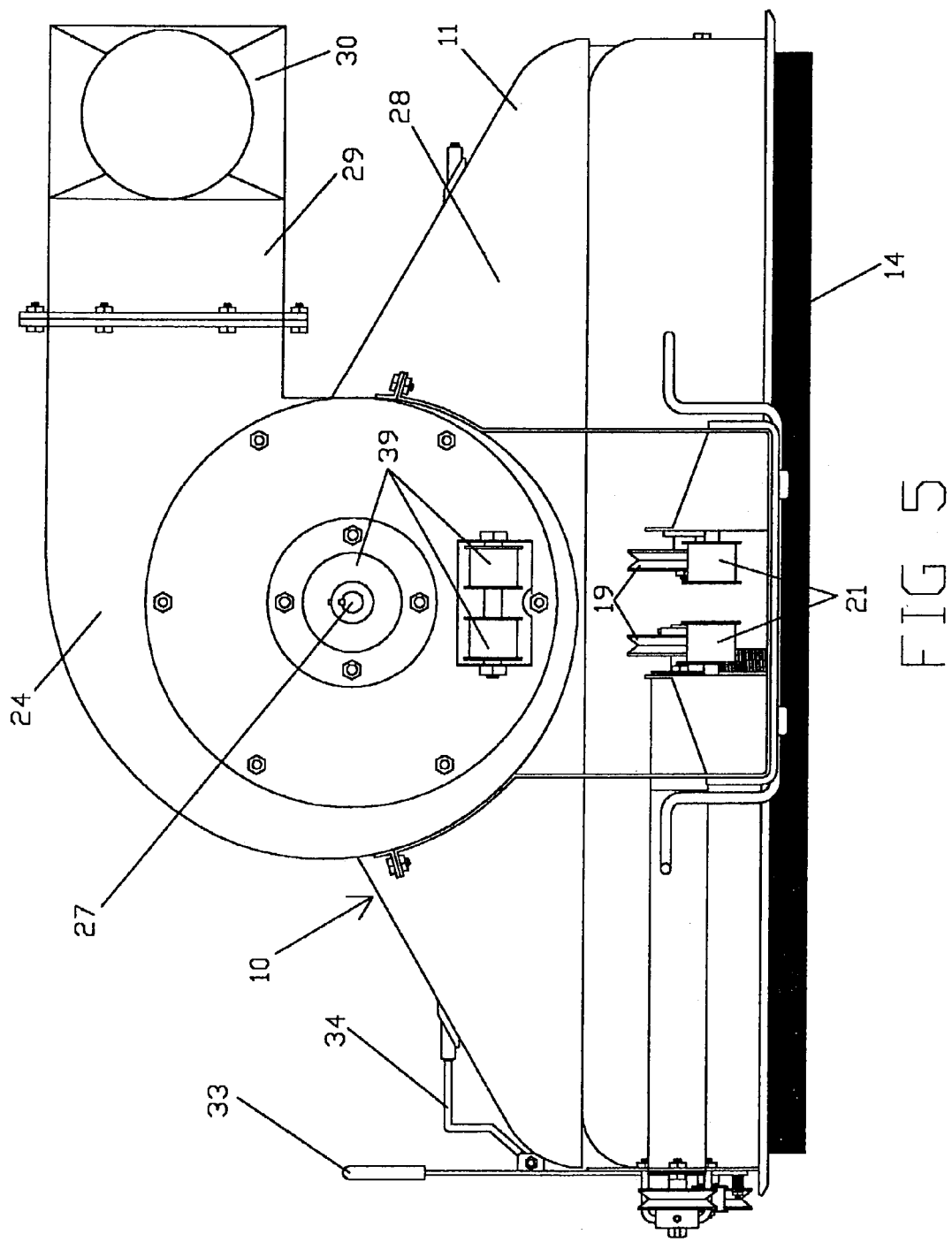
FIG. 5 is an enlarged view in rear elevation of the mobile sweeper apparatus of the present invention shown in the previous figures with the belt cover removed and without the attachment of the lawn tractor.
Figure 6:
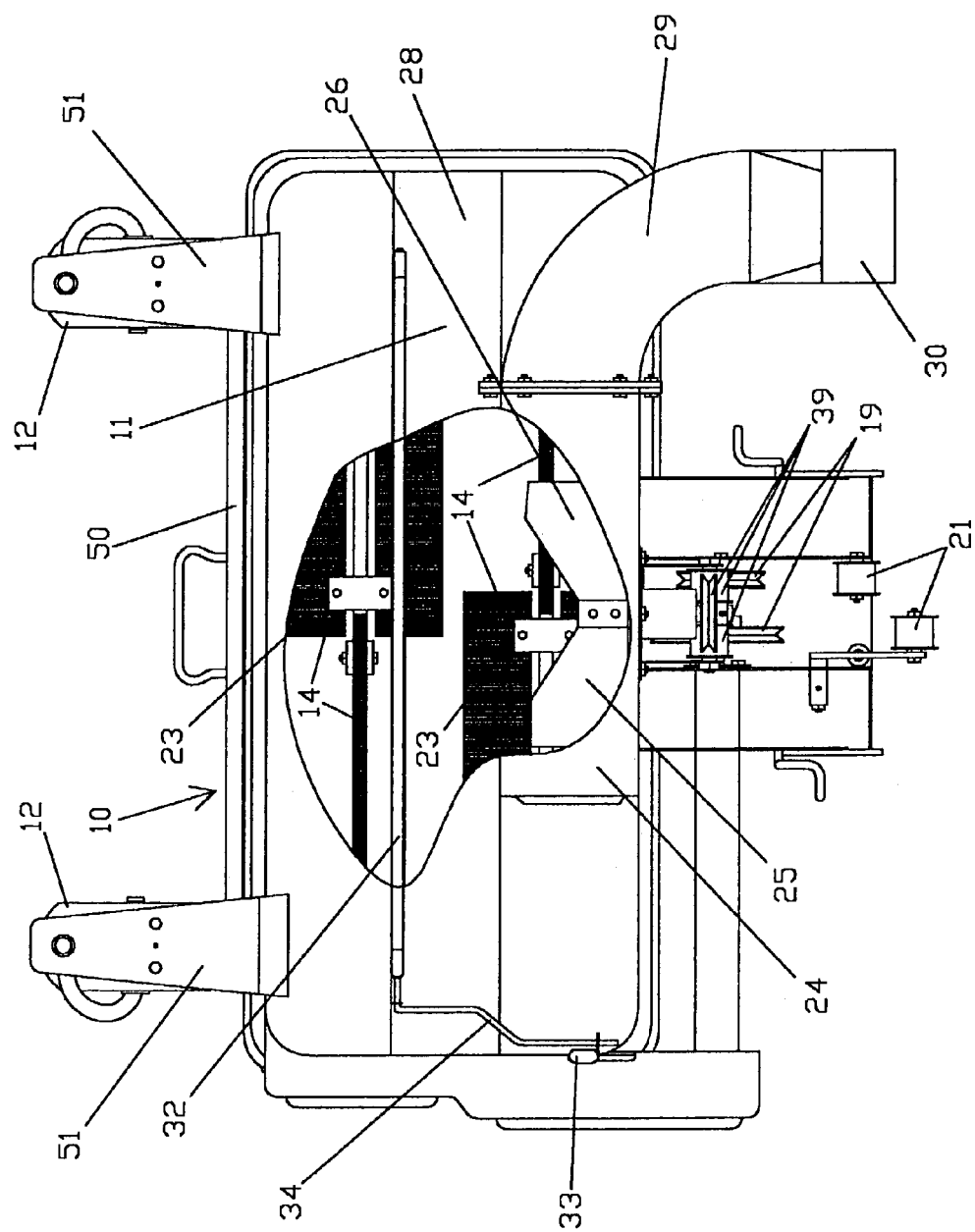
FIG. 6 is a top or plan view of the apparatus illustrated in FIG. 5 with central portions and the belt cover removed to disclose interior components, including the damper valve plate shown in an open condition.
Figure 7:
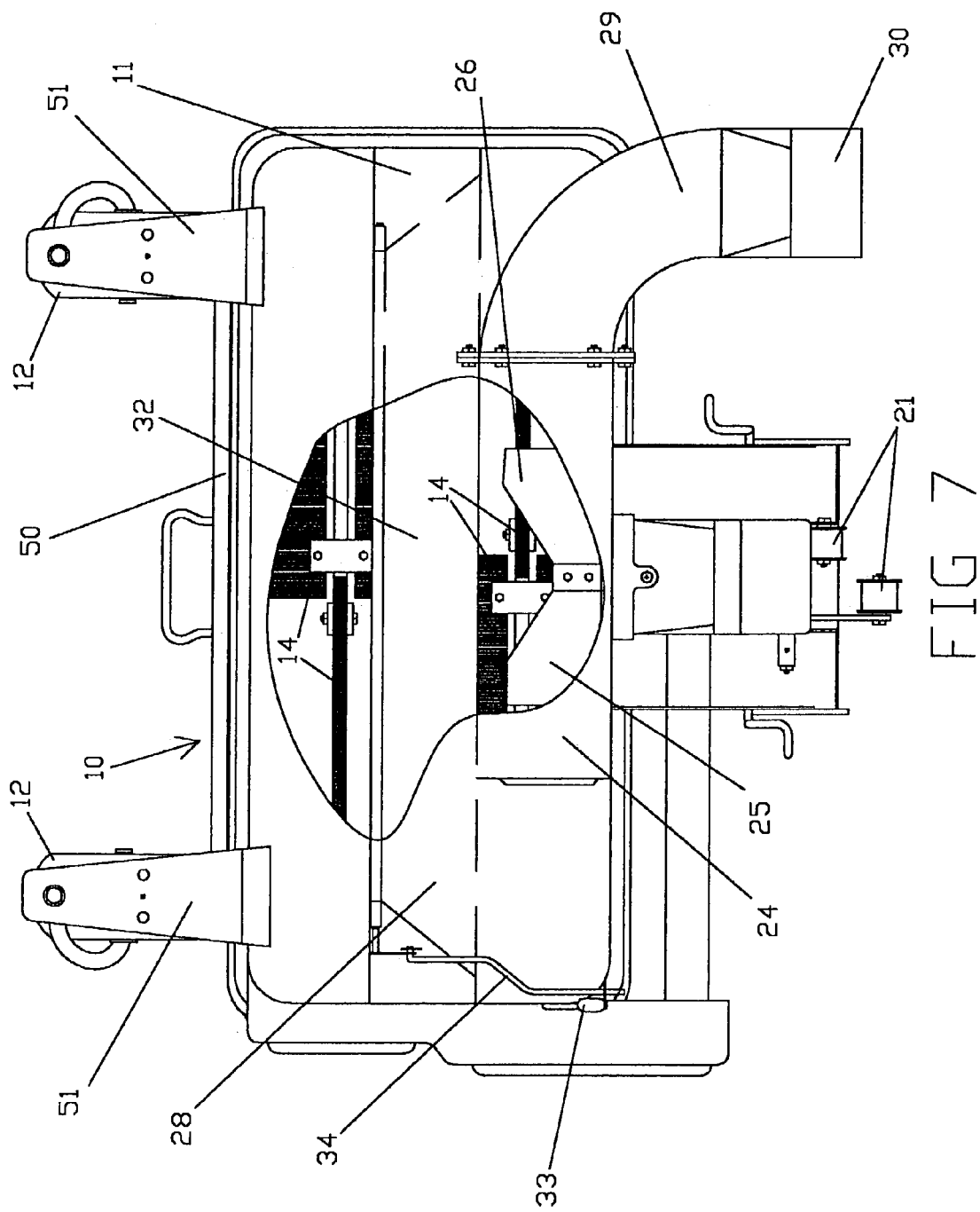
FIG. 7 is a top view of the mobile sweeper apparatus of the present invention of FIG. 5 as shown with central portions removed to reveal the interior thereof as in FIG. 6, but illustrating the damper valve plate in a closed position.
Figure 8:
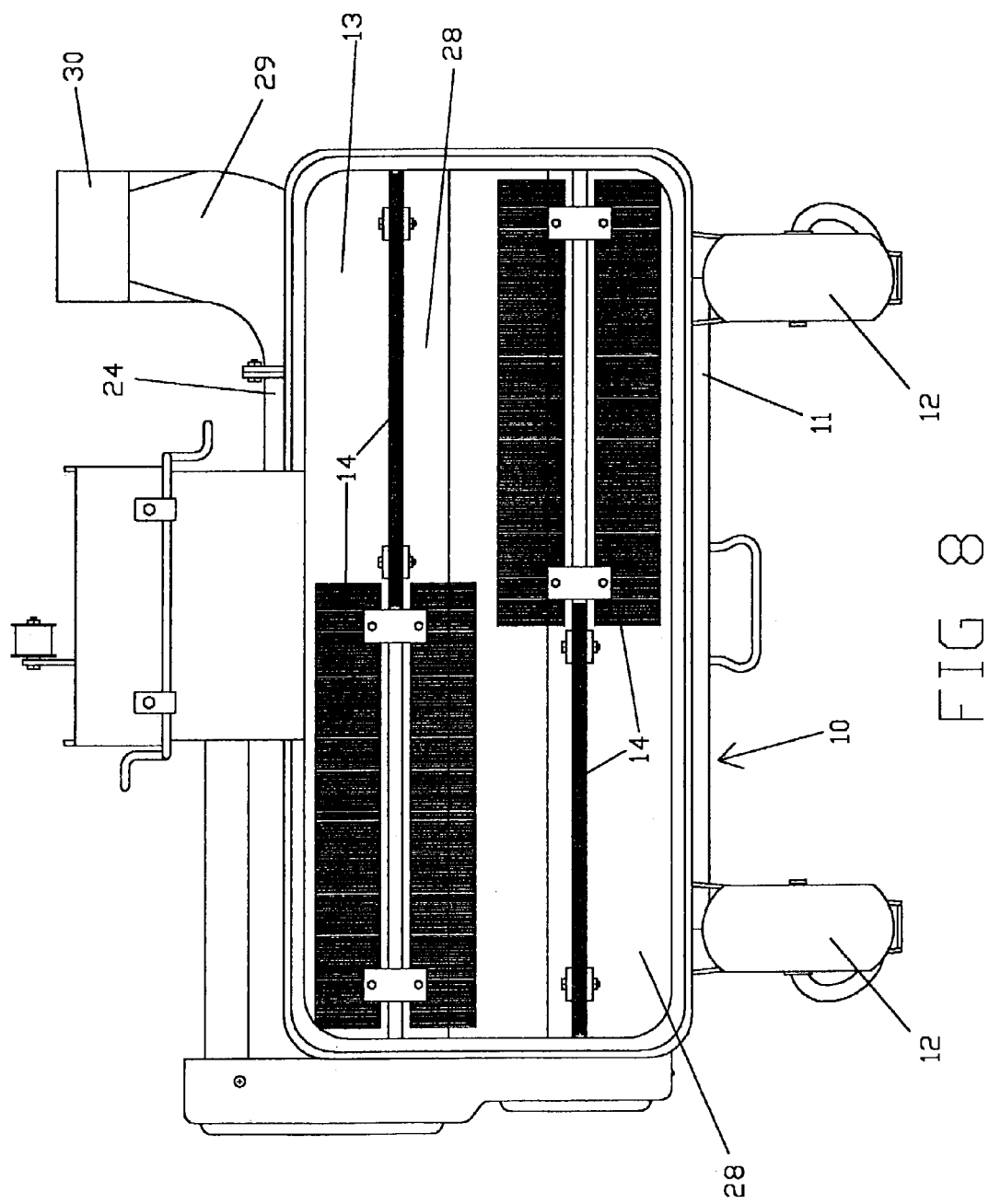
FIG. 8 is a bottom view of the mobile sweeper apparatus of the present invention illustrated in FIGS. 5 through 7 exposing the rotary brush mechanism.

Referring first to FIGS. 1 through 8, the mobile sweeper apparatus 10 of the present invention includes a housing 11 supported on wheels 12 for forward and rearward movement over an underlying surface to be swept of debris. The housing 11 is provided with a bottom opening 13 which is best illustrated in FIG. 8.

A pair of substantially parallel elongated rotary brushes 14 are mounted in housing 11 for rotation about axis 15 extending in the direction of their elongation and transverse to the direction of normal forward movement of housing 11. Brushes 14 are of a paddle type or shape and project through the bottom opening 13 of housing 11 for sweeping an underlying surface. A drive mechanism 16, partially illustrated in FIGS. 10 and 11 in the form of a belt drive, is utilized to drive brushes 14 in counter rotation as indicated by arrows 17 in FIG. 10 whereby debris is swept upwardly between brushes 14 as indicated by arrow 18 in FIG. 10. This drive mechanism 16 is ultimately driven from a primary belt drive on pulleys 19, which primary belt drive connects to a power takeoff (not shown) on motorized vehicle or lawn tractor 20 via idler tension pulley 21. Mobile sweeper apparatus 10 is coupled for driving to the forward end of lawn tractor 20 via conventional pin coupling 22. Rotary brushes 14 have radially extending bristles 23 provided in the form of elongate bristle paddle type sweeper blades.

A vacuum shredder fan 24 having a rotating mulching/shredding impeller 25 is provided with shredder blades 26. Impeller 25 axially rotates about its center axis 27 and is belt driven off of pulleys 19 and 39.

Shredder fan 25 operates to vacuum in debris swept up from between rotary brushes 14 through vacuum chute 28 into shredder fan 24 thereby causing the debris, such as, sticks and leaves, to be mulched and/or shredded and discharged therefrom through discharge chute 29 through conduit 30 to rear discharge container 31 for collection.

Figure 10:
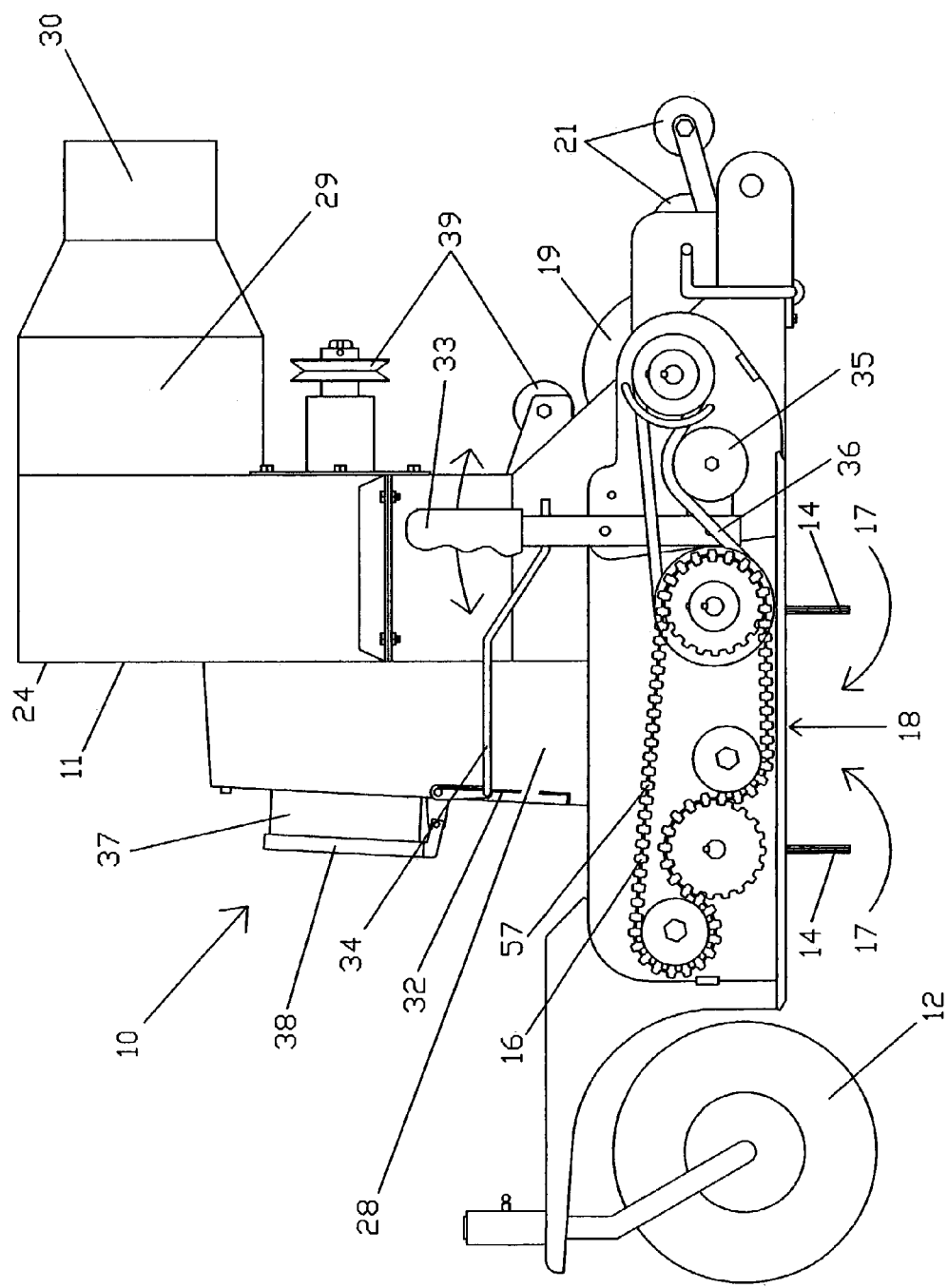
FIG. 10 is an enlarged view in left side elevation of the mobile sweeper apparatus of the present invention as previously illustrated in FIG. 1 but shown unattached to the lawn tractor and with its side cover plate removed to expose the interior drive mechanism.
Figure 11:
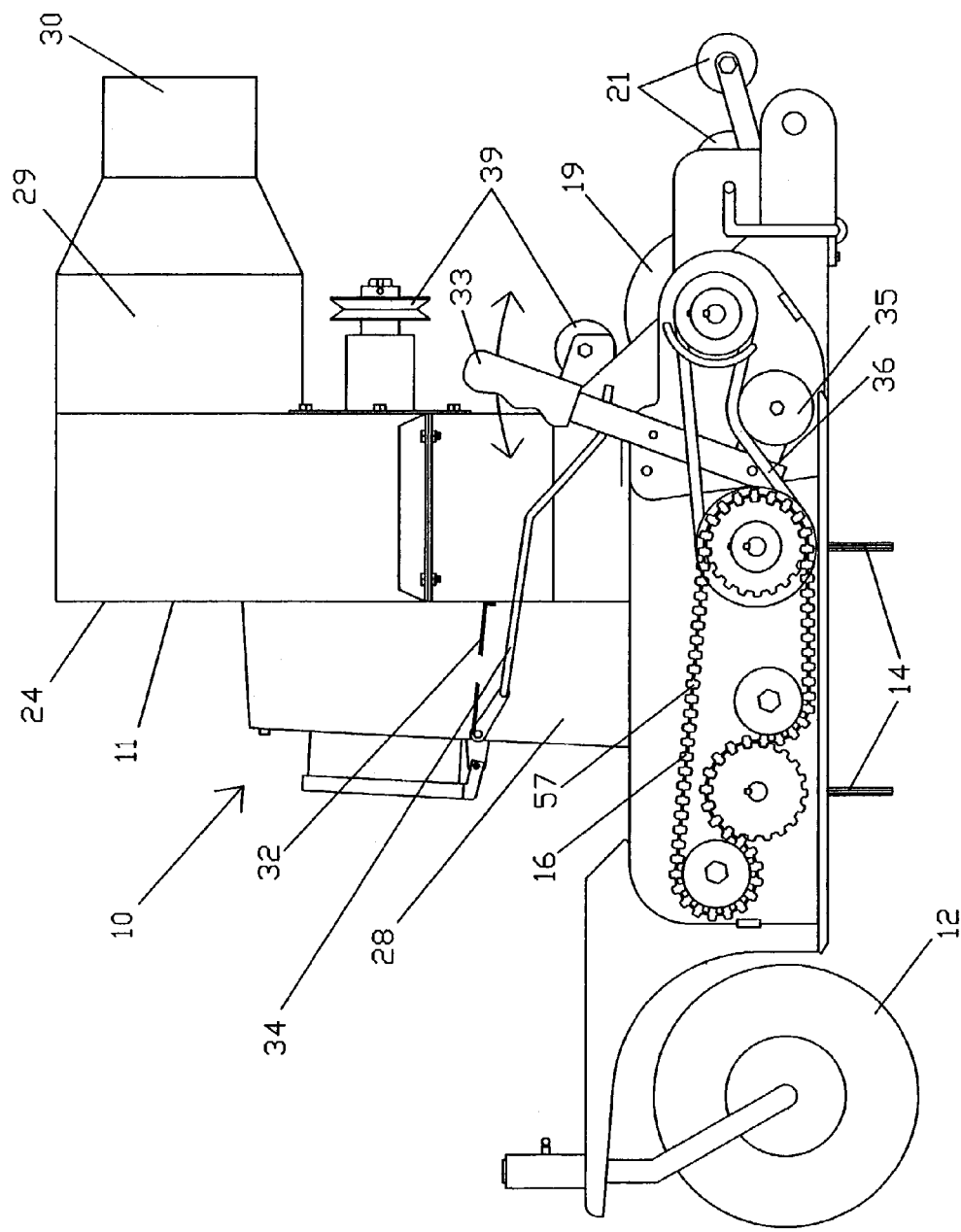
FIG. 11 is an enlarged view in left side elevation showing the same exposure of FIG. 10 with the exception that FIG. 10 illustrates the structure with the brush mechanism engaged and the vacuum valve plate open and the structure of FIG. 11 illustrates the brush mechanism as being disengaged and the vacuum valve plate or dam closed for utilizing the apparatus of the present invention solely as a vacuum shredder or mulching device.

With particular reference to FIGS. 4, 6, 7, 10 and 11, a damper valve dam or plate 32 is disposed in vacuum chute 28 between brushes 14 and shredder fan 24 and is operable through a linkage for closing off vacuum chute 28 by means of operating lever arm 33. The operation of lever arm 33 is best illustrated in FIGS. 10 and 11. When lever arm 33 is moved to its most forward position as shown in FIG. 10, damper valve plate 32 is forced into its open position with a linkage as shown in FIG. 10 by connecting rod 34. In this position, lever arm 33 also engages idler pulley 35, which is a belt tensioning pulley, against belt 36 which causes belt 57 to drive rotary brushes 14 as previously described. When lever arm 33 is in its rearward most position as indicated in FIG. 11, damper valve plate 32 is forced to its closed position as shown in FIG. 11 whereby vacuum chute 28 is closed off and the drive mechanism 16 for brushes 14 is also disengaged so that brushes 14 no longer rotate.

Figure 12:
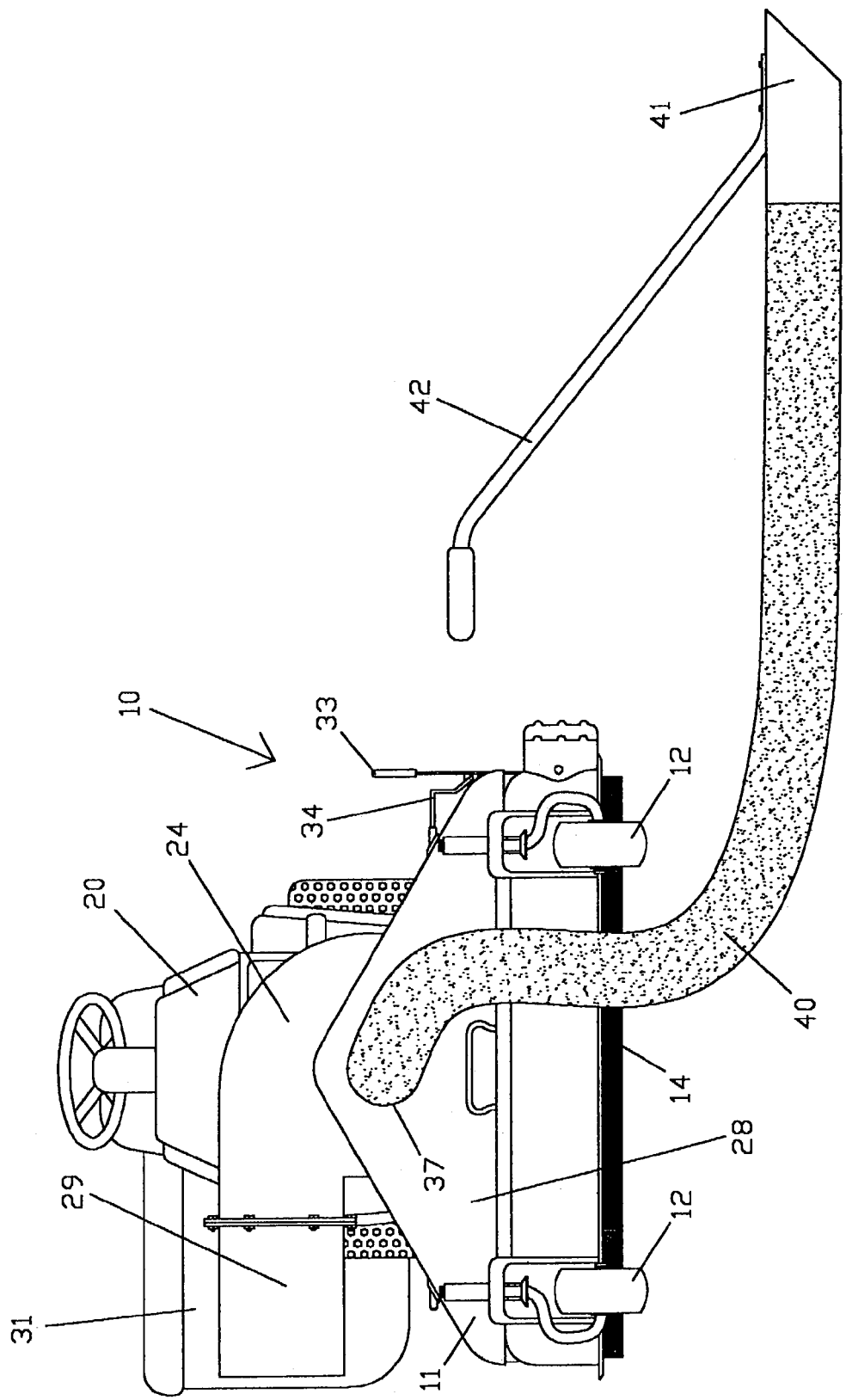
FIG. 12 is a view in front elevation of the apparatus illustrated in FIGS. 1 through 3 with a vacuum hose attached to the forward end thereof for vacuuming up debris.

Vacuum port 37 is positioned on vacuum chute 28 between damper valve plate 32 and shredder fan 24 and is provided with a spring loaded cover 38 which is normally closed and may be open for connecting port 37 to a vacuum conduit for vacuum communication with shredder fan 24. As is illustrated in FIG. 12, the vacuum conduit is here provided in the form of a vacuum hose 40 which is connected to port 37 and is further provided at its distal end with a vacuum nozzle 41 for vacuuming debris such as leaves. In order to easily manipulate nozzle 41, it is provided with a handle 42.

Figure 13:
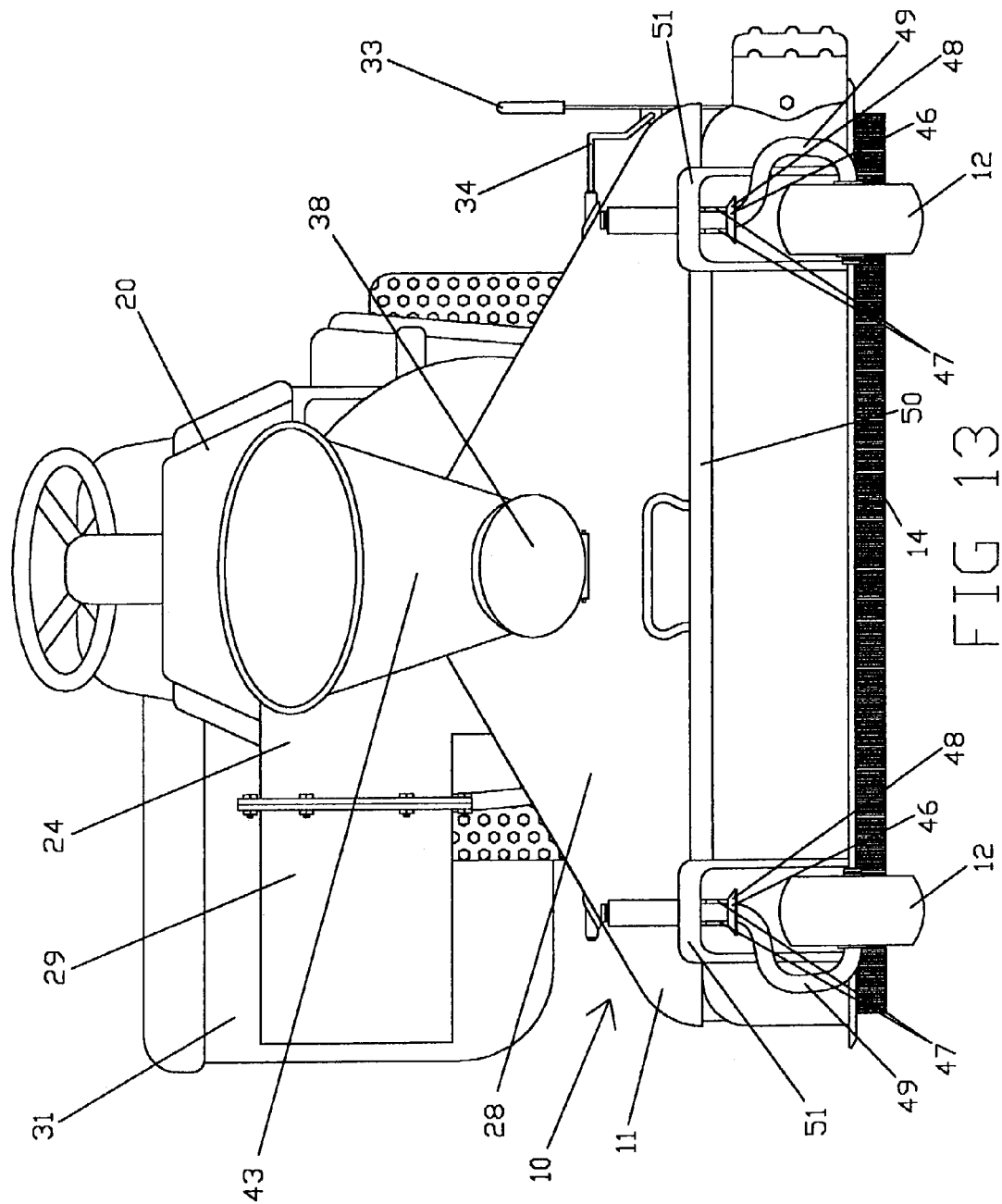
FIG. 13 is a view in front elevation of the mobile sweeper apparatus of the present invention as originally disclosed in FIGS. 1 through 3 with a funnel chute attached to the forward end of the housing for inserting debris to be chipped, shredded or mulched.

Referring next to FIG. 13, the vacuum conduit is shown as funnel chute 43, in which debris such as sticks and leaves may be inserted to be chipped, shredded and/or mulched in shredder fan 25 and then discharged on to container 31 for collection and disposal.

Figure 9:
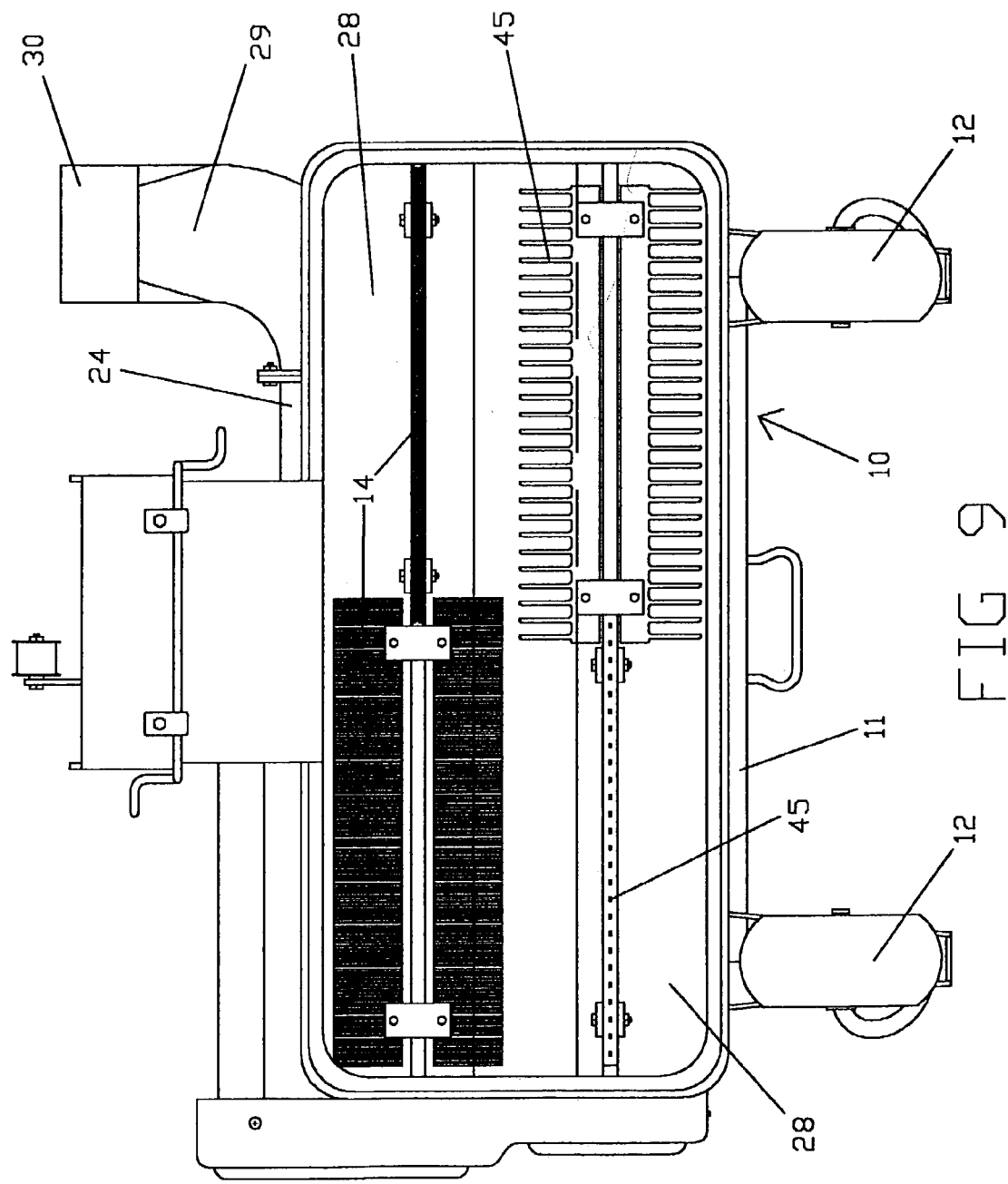
FIG. 9 is a bottom view of the apparatus of the present invention as previously shown in FIGS. 5 through 7 illustrating a modification of the rotary brush mechanism wherein portions of the rotary brushes have been substituted with rotary wire thatching tines.

Also, one or both, or portions of one of the rotary brushes 14 may be substituted with radially extending wire tines 45 as illustrated in FIG. 9 for thatching a lawn.

In addition, the housing 11 includes height adjustment mechanism 46 for adjusting the height of the housing 11 above the underlying surface by raising the housing 11 or lowering the housing 11 relative to wheels 12. The raising or lowering of the housing 11 is accomplished with lever arm 50 seen in FIGS. 13 and 14. FIG. 13 shows the housing 11 in the raised position and FIG. 14 shows the housing 11 in the lowered position.

Figure 14:
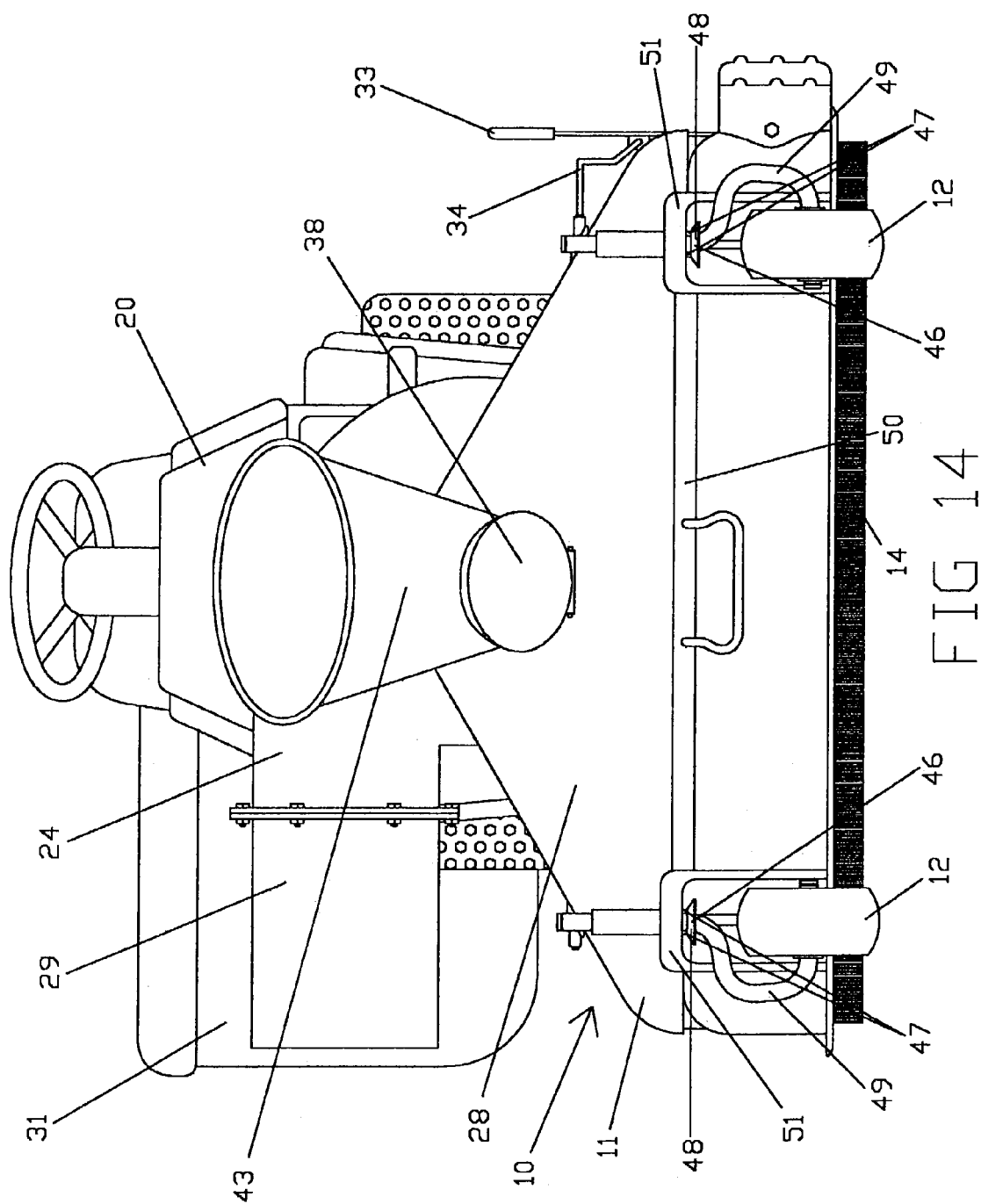
FIG. 14 is a view in front elevation illustrating the mobile sweeper apparatus of FIG. 13 with the housing shown in its lowered position as opposed to the raised position shown in FIG. 13.

When lever arm 50 is rotated downward as shown in FIG. 14, the slide cam 47 is moved horizontally through conventional linkage towards the housing between the cam follower 48 and the wheel housing 51. When lever arm 50 is rotated upwards as shown in FIG. 13, the slide cam 47 is forced between the cam follower 48 and the wheel housing 51 increasing the height of the housing from the underlying surface. This height adjustment permits adjustment for different sweeping conditions.

Figure 15:
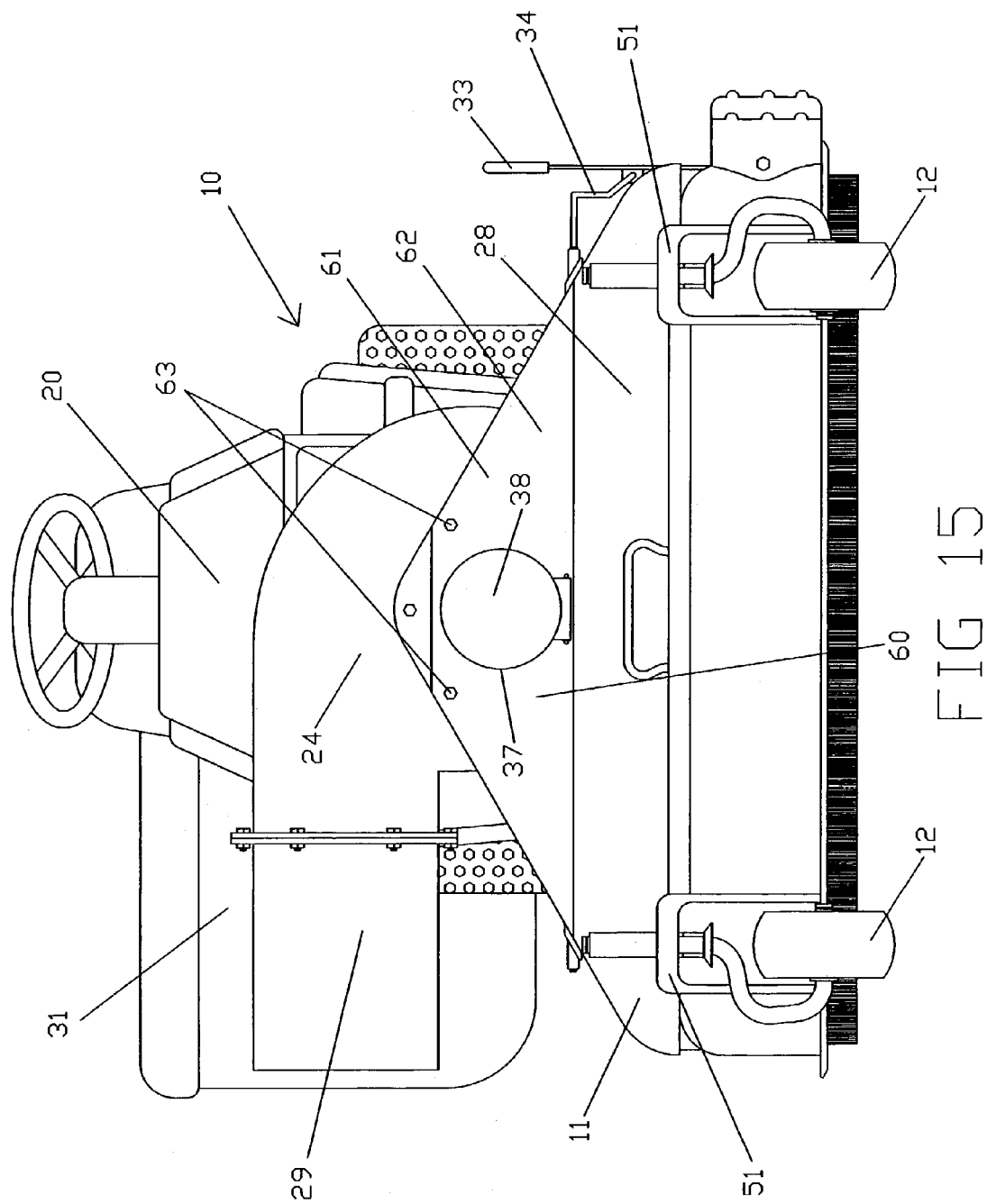
FIG. 15 is a view in front elevation of the mobile sweeper apparatus of the present invention as originally disclosed in FIGS. 1 through 3 with the inclusion of a clean-out assembly for accessing the interior of the vacuum chute to remove impacted debris.
Figure 16:
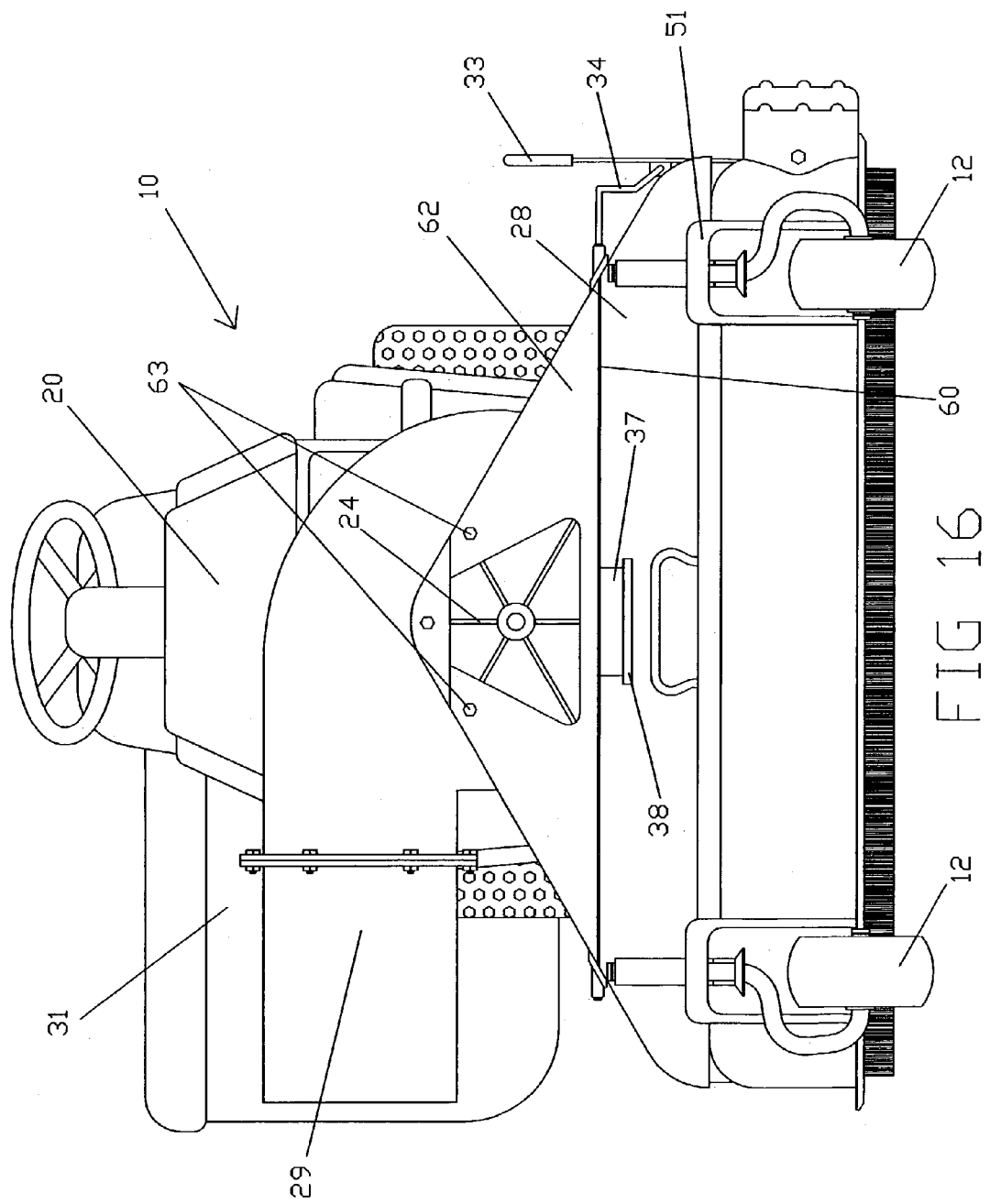
FIG. 16 is a view in front elevation of the mobile sweeper apparatus illustrated in FIG. 15 with the clean-out assembly shown in an open condition for interior clean-out of the vacuum chute.
Figure 17:
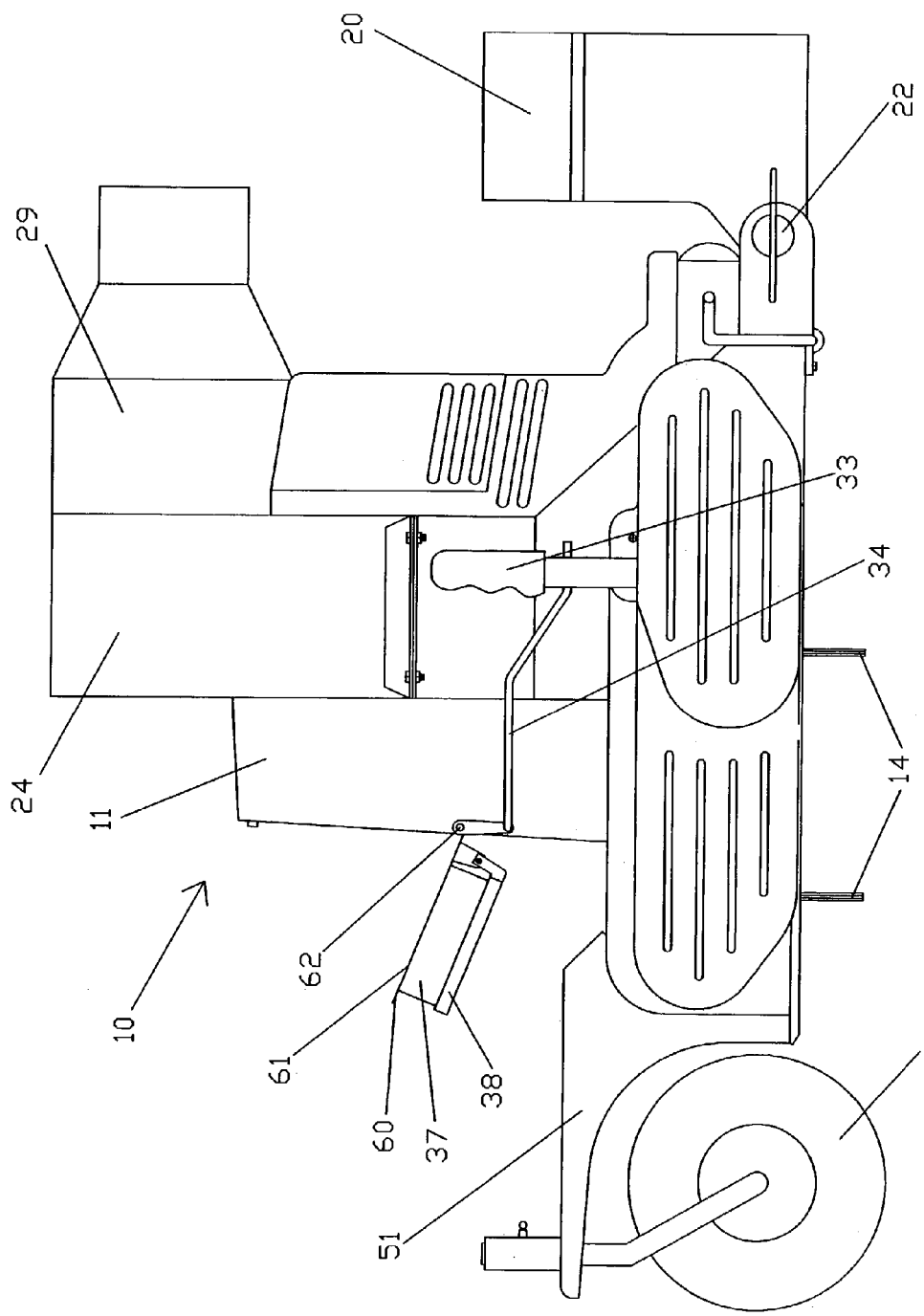
FIG. 17 is a view in right side elevation of the mobile sweeper apparatus shown in FIG. 16.

Referring next to FIGS. 15, 16 and 17, a clean-out assembly 60 of the present invention is illustrated for the mobile sweeper apparatus 10 of the present invention. The clean-out assembly 60 includes a hinged clean-out cover plate 61 which hinges forward at its base on elongated hinge 62. Clean-out plate 61 is maintained in place in its closed position with the two latch pins 63. When it is required to clean out impacted debris within the vacuum chute 28, the latch pins 63 are removed or opened and the entire clean-out plate 61 is hinged forward, together with port 37 mounted thereon, to provide access to the interior, as is illustrated in FIGS. 16 and 17.

Of course the apparatus is turned off and is not running when making a clean-out in order to prevent injury, and in this regard, safety switches may be employed to kill the drive mechanism for the shredder fan 24 as a safety feature. After clean-out of chute 28 has been accomplished, the clean-out plate 61 is hinged to its original closed position as shown in FIG. 15 and secured with latch pins 63.

I claim:

1. A mobile sweeper apparatus comprising;
a wheel supported housing to be moved over an underlying surface to be swept of debris and having a bottom opening;
rotary brush means mounted in said housing and projecting through the bottom opening of said housing for sweeping up debris from said underlying surface;
drive means connected for rotatably driving said brush means;
a vacuum fan with shredder means mounted in said housing and communicating through a vacuum chute with said bottom opening for drawing in, shredding and discharging debris swept up by said brush means;
a damper valve plate disposed in said vacuum chute between said brush means and vacuum fan and operable for closing off said vacuum chute;
a normally closed vacuum port positioned on said vacuum chute between said damper valve plate and said vacuum fan with shredder means for connecting a vacuum conduit to said port for vacuum communication with said fan; and
a linkage connected to said damper valve plate and to said drive means for simultaneously disengaging said drive means and closing off said vacuum chute with said damper valve plate.

2. The mobile sweeper apparatus of claim 1, including a clean-out assembly for said vacuum chute permitting access to the interior of said vacuum chute for removal of impacted debris.

3. The mobile sweeper apparatus of claim 2, wherein said clean-out assembly includes a normally closed clean-out plate hinged to and forming part of said vacuum chute and having said normally closed vacuum port mounted thereon and moveable therewith.

4. The mobile sweeper apparatus of claim 1, wherein said vacuum conduit is a vacuum hose for vacuuming up debris.

5. The mobile sweeper apparatus of claim 1, wherein said vacuum conduit is a funnel chute for inserting debris to be shred by said fan with shredder means.

6. The mobile sweeper apparatus of claim 1, including attachment means for attaching said housing to a motorized vehicle for moving said housing, and said drive means including a power take-off from said motorized vehicle.

7. The mobile sweeper apparatus of claim 6, wherein said power take-off includes a drive belt with a spring loaded belt tensioning pulley.

8. The mobile sweeper apparatus of claim 1, wherein said rotary brush means includes parallel counter rotating brushes whereby debris is swept upwardly between said brushes.

9. The mobile sweeper apparatus of claim 1, wherein said rotary brush means includes thatching tines for thatching.

10. The mobile sweeper apparatus of claim 1, including height adjustment means for adjusting the height of said housing above said underlying surface.

11. A mobile sweeper apparatus comprising;
a wheel supported housing to be moved over an underlying surface to be swept of debris and having a bottom opening;
rotary brush means mounted in said housing and projecting through the bottom opening of said housing for sweeping up debris from said underlying surface;
drive means connected for rotatably driving said brush means;
a vacuum fan with shredder means mounted in said housing and commuting communicating through a vacuum chute with said bottom opening for drawing in, shredding and discharging debris swept up by said brush means;
a damper valve plate disposed in said vacuum chute between said brush means and vacuum fan and operable for closing off said vacuum chute;
a normally closed vacuum port positioned on said vacuum chute between said damper valve plate and said vacuum fan with shredder means for connecting a vacuum conduit to said port for vacuum communication with said fan; and
a clean-out assembly providing access to the interior of said vacuum chute for removal of impacted debris.

12. The mobile sweeper apparatus of claim 11, wherein said clean-out assembly includes a clean-out plate which is hinged to and provides part of said vacuum chute and wherein said vacuum port is mounted thereon and moves therewith.

13. The mobile apparatus of claim 11, including a linkage for simultaneously disengaging said drive means and closing off said vacuum chute with said damper valve plate.

14. The mobile sweeper apparatus of claim 11, wherein said vacuum conduit is a vacuum hose for vacuuming up debris.

15. The mobile sweeper apparatus of claim 11, wherein said vacuum conduit is a funnel chute for inserting debris to be shred by said fan with shredder means.

16. The mobile sweeper apparatus of claim 11, including attachment means for attaching said housing to a motorized vehicle for moving said housing, and said drive means including a power take-off from said motorized vehicle.

17. The mobile sweeper apparatus of claim 16, wherein said power take-off includes a drive belt with a spring loaded belt tensioning pulley.

18. The mobile sweeper apparatus of claim 11, wherein said rotary brush means includes parallel counter rotating brushes whereby debris is swept upwardly between said brushes.

19. The mobile sweeper apparatus of claim 11, wherein said rotary brush means includes thatching tines for thatching.

20. The mobile sweeper apparatus of claim 11, including height adjustment means for adjusting the height of said housing above said underlying surface.

* * * * *